United States Patent
Armangau et al.

(10) Patent No.: US 9,727,479 B1
(45) Date of Patent: Aug. 8, 2017

(54) COMPRESSING PORTIONS OF A BUFFER CACHE USING AN LRU QUEUE

(71) Applicant: EMC Corporation, Hopkinton, MA (US)

(72) Inventors: Philippe Armangau, Acton, MA (US); Vasily Olegovich Zalunin, Saint Petersburg (RU); Rustem Rafikov, Saint Petersburg (RU); Christopher A. Seibel, Walpole, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 386 days.

(21) Appl. No.: 14/502,244

(22) Filed: Sep. 30, 2014

(51) Int. Cl.
*G06F 12/08* (2016.01)
*G06F 12/0891* (2016.01)
*G06F 12/0866* (2016.01)

(52) U.S. Cl.
CPC ...... *G06F 12/0891* (2013.01); *G06F 12/0866* (2013.01); *G06F 2212/281* (2013.01); *G06F 2212/401* (2013.01); *G06F 2212/69* (2013.01)

(58) Field of Classification Search
CPC ............. G06F 12/0891; G06F 12/0866; G06F 2212/281; G06F 2212/401; G06F 2212/69
See application file for complete search history.

(56) References Cited

U.S. PATENT DOCUMENTS

| | | | | |
|---|---|---|---|---|
| 6,516,397 B2 * | 2/2003 | Roy | ......................... | G06F 12/08 709/247 |
| 6,701,393 B1 * | 3/2004 | Kemeny | ............... | G06F 12/122 710/40 |
| 7,003,646 B2 * | 2/2006 | Roy | ....................... | G06F 12/023 711/170 |
| 7,243,191 B2 * | 7/2007 | Ying | .................... | G06F 12/0802 711/118 |
| 7,509,461 B1 * | 3/2009 | Bhayana | ............. | G06F 12/0866 711/144 |
| 7,555,504 B2 | 6/2009 | Bixby et al. | | |
| 8,661,068 B1 | 2/2014 | Seibel et al. | | |
| 8,886,883 B1 * | 11/2014 | Derbeko | ............. | G06F 12/0866 711/111 |
| 8,943,282 B1 * | 1/2015 | Armangau | ........ | G06F 17/30088 711/126 |
| 9,026,737 B1 * | 5/2015 | Armangau | .......... | G06F 12/0822 711/118 |
| 9,053,018 B2 * | 6/2015 | Fontenot | ................. | G06F 12/04 |
| 9,069,669 B2 * | 6/2015 | Li | ........................... | G06F 12/02 |
| 9,122,697 B1 | 9/2015 | Bono et al. | | |
| 9,122,712 B1 | 9/2015 | Bono et al. | | |
| 9,135,123 B1 * | 9/2015 | Armangau | .......... | G06F 11/1471 |
| 9,280,578 B1 * | 3/2016 | Zhou | ................. | G06F 17/30171 |
| 9,519,590 B1 * | 12/2016 | Armangau | .......... | G06F 12/0871 |
| 2004/0030847 A1 * | 2/2004 | Tremaine | .............. | G06F 12/023 711/154 |
| 2004/0168031 A1 * | 8/2004 | Haskins | .............. | G06F 12/0804 711/136 |

(Continued)

*Primary Examiner* — David X Yi
*Assistant Examiner* — Ramon A Mercado
(74) *Attorney, Agent, or Firm* — BainwoodHuang (57) ABSTRACT

Techniques are described for compressing cache pages from an LRU (Least-Recently-Used) queue so that data takes longer to age off and be removed from the cache. This increases the likelihood that data will be available within the cache upon subsequent re-access, reducing the need for costly disk accesses due to cache misses.

19 Claims, 7 Drawing Sheets

(56) References Cited

U.S. PATENT DOCUMENTS

| | | | | |
|---|---|---|---|---|
| 2004/0210794 | A1* | 10/2004 | Frey | G06F 11/1076 714/5.1 |
| 2009/0292861 | A1* | 11/2009 | Kanevsky | G06F 3/061 711/103 |
| 2010/0223429 | A1* | 9/2010 | Cher | G06F 12/0253 711/122 |
| 2012/0036325 | A1* | 2/2012 | Mashtizadeh | G06F 12/0802 711/118 |
| 2014/0115256 | A1* | 4/2014 | Liu | G06F 12/0866 711/122 |

* cited by examiner

COMPRESSING PORTIONS OF A BUFFER CACHE USING AN LRU QUEUE

BACKGROUND

Data storage systems are arrangements of hardware and software that may include multiple storage processors coupled to arrays of non-volatile storage devices. In typical operation, the storage processors service storage requests that arrive from users. The storage requests specify files or other data elements to be written, read, created, or deleted, for example. The storage processors run software that manages incoming storage requests and perform data processing tasks to organize and secure user data stored on the non-volatile storage devices.

Some data storage systems provide caches composed of high-speed memory. These data storage systems use such caches to store frequently accessed data backed by magnetic disk or other storage media. By providing frequently accessed data on such caches, the data storage systems are able to respond more quickly to storage requests than they could if it were always necessary to access frequently used data from magnetic disk.

In some systems, as data is released from active use, cache descriptors for such data are placed on a least-recently-used (LRU) queue with the possibility to be re-accessed from (and therefore removed from) the LRU queue later. Once the cache becomes full, data associated with the least-recently accessed cache descriptors on the LRU queue will be deleted from the cache to make room for newer data in the cache.

SUMMARY

Unfortunately, the above-described conventional systems suffer from deficiencies. For example, once data ages off of the LRU queue, it may be re-accessed shortly thereafter, resulting in a cache miss, which may negatively impact performance due to the need for a slow disk access. Thus, it would be desirable to extend the useful capacity of cache by increasing the number of entries on the LRU queue without allocating extra memory to the cache. This may be accomplished by compressing cache pages from the LRU queue so that data takes longer to age off and be removed from the cache. This increases the likelihood that data will be available within the cache upon subsequent re-access, reducing the need for costly disk accesses due to cache misses.

One embodiment of the improved techniques is directed to a method performed by a computing device of improving utilization of cache space of the computing device. The method includes (a) storing data used by a set of cache managers in a set of buffer cache pages of memory of the computing device, each buffer cache page of the set of buffer cache pages being pointed to by a respective associated buffer cache descriptor (BCD), (b) upon any buffer cache page of the set of buffer cache pages becoming unused by the set of cache managers, placing the associated BCD of that buffer cache page onto a tail end of an LRU (least-recently-used) queue, the LRU queue being arranged such that BCDs that point to buffer cache pages that were used more recently are positioned closer to the tail end and BCDs that point to buffer cache pages that were used less recently are positioned closer to a head end of the LRU queue, (c) for a set of BCDs positioned at the head end of the LRU queue, compressing the buffer cache pages pointed to by those BCDs into fewer buffer cache pages, thereby freeing at least one buffer cache page for reuse, and (d) adjusting pointers within the set of BCDs positioned at the head end of the LRU queue to point to locations within the fewer buffer cache pages. Other embodiments are directed to a system, a computerized apparatus, and a computer program product for performing methods of improving utilization of cache space similar to those described above.

These embodiments are particularly advantageous because they allow a data storage system to keep large amounts of filesystem metadata in cache, minimizing the amount of cache miss operations for frequently-accessed filesystem metadata. These embodiments are also useful in the context of data (as opposed to metadata) stored in cache.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for compressing cache pages from an LRU (Least-Recently-Used) queue so that data takes longer to age off and be removed from the cache. This increases the likelihood that data will be available within the cache upon subsequent re-access, reducing the need for costly disk accesses due to cache misses.

Figure 1:
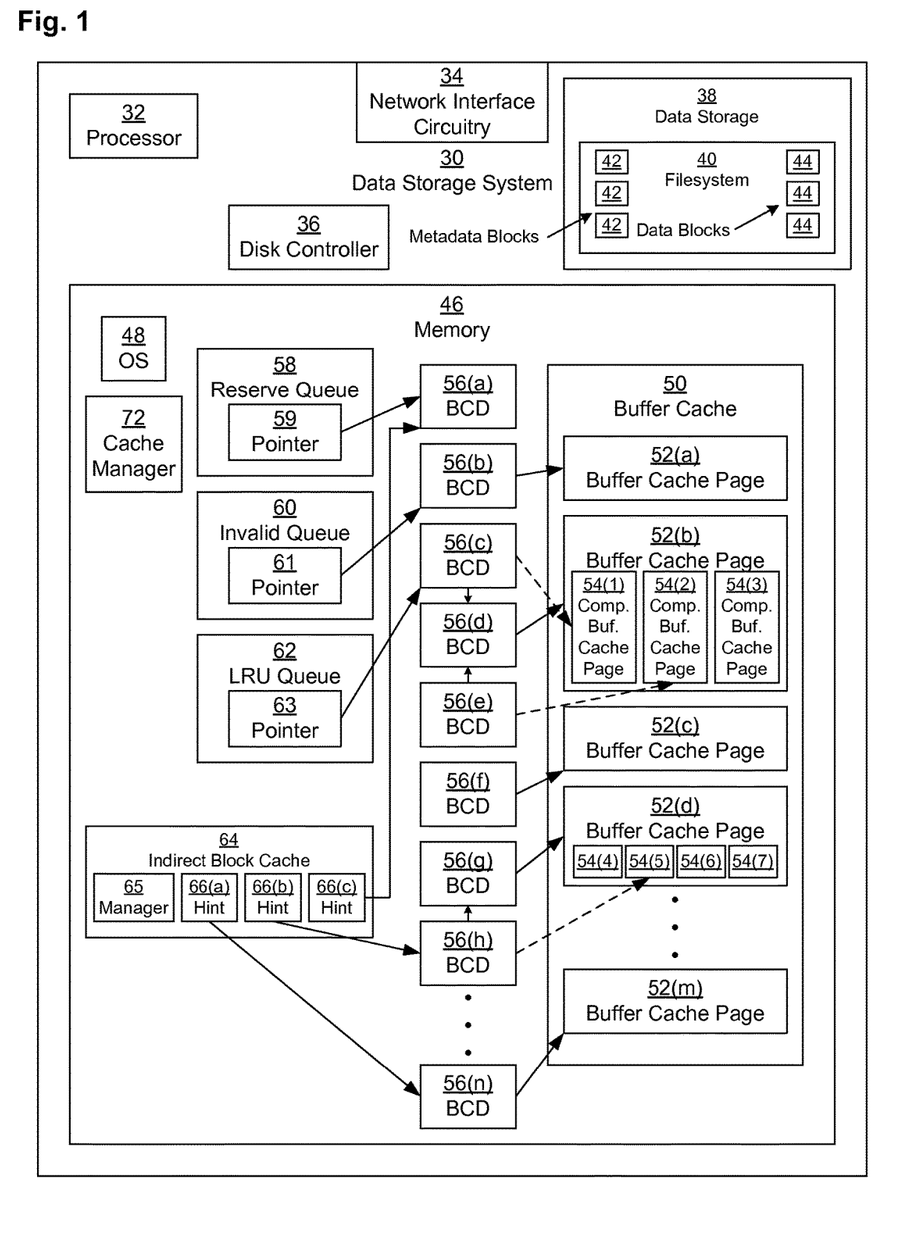
FIG. 1 depicts an example data storage system according to various embodiments.

FIG. 1 depicts an example data storage system (DSS) 30. Typically, DSS 30 will be a data storage array, such as, for example, a VNX®, VNXe®, or CLARiiON® CX4 data storage array provided by the EMC Corporation of Hopkinton, Mass. However, in some embodiments, DSS 30 may be any kind of computing device, such as, for example, a personal computer, a workstation computer, a server computer, an enterprise server computer, a laptop computer, a tablet computer, a smart phone, etc. instead of a data storage system.

DSS 30 includes processing circuitry 32, network interface circuitry 34, disk controller circuitry 36, persistent data storage 38, and memory 46. Processing circuitry 32, network interface circuitry 34, disk controller circuitry 36, and memory 46 may take the form of a storage processor board having various components thereon. There may be multiple independent storage processor boards per DSS 30, arranged in a highly-available fault-tolerant manner.

Network interface circuitry 34 may include one or more Ethernet adapters, Fibre Channel adapters, iSCSI adapters, cellular modems, Wireless Fidelity (WiFi) wireless networking adapters, any other devices for connecting to a network, or some combination thereof.

Processor 32 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Disk controller circuitry 36 includes processing circuitry configured to control and connect to the persistent data storage 38. Persistent data storage 38 may include one or more persistent data storage devices, such as, for example, a hard disk, a solid state storage device (SSD), an optical drive, or any similar storage device.

Data storage 38 stores a filesystems 40. In some embodiments (not depicted), multiple filesystems 40 may be stored within data storage 38. Each filesystem 40 contains a set of blocks 42, 44 (e.g., 512 byte blocks, 4 kilobyte blocks, 8 kilobyte blocks, 64 kilobyte blocks, etc.). Data blocks 44 typically store user data, for example, to support storage of files. Metadata blocks 42 store information about the structure of the filesystem 40, such as, for example, inodes and indirect blocks that point to data blocks 44 of a file.

Memory 46 may be any kind of digital system memory, such as, for example, random access memory (RAM). Memory 46 stores an operating system (OS) 48 (e.g., Linux, UNIX, Windows, or a similar operating system) and one or more applications (not depicted) executing on processor 42 as well as data (not depicted) used by those applications.

Memory 46 also stores a buffer cache 50. Buffer cache 50 is made up of a number of buffer cache pages 52 (depicted as buffer cache pages 52(a), 52(b), 52(c), 52(d), . . . , 52(m)). Typically, each buffer cache page 52 is a fixed size (e.g., 8 kilobytes) and there is a fixed number, m, of buffer cache pages 52 within the buffer cache 50 (e.g., $2^{30}$ pages which take up 8 gigabytes of memory space).

In accordance with improvements hereof, some of the buffer cache pages 52 are compressed. Thus, as depicted, buffer cache pages 52(b) and 52(d) are compressed containers, each one containing a plurality of compressed logical buffer cache pages 54. These compressed logical buffer cache pages 54 are referred to as being "logical" because they represent data that once made up a buffer cache page 52, and a compressed logical buffer cache pages 54 can be decompressed into a new buffer cache page 52 as needed.

As depicted, compressed buffer cache page container 52(b) stores three compressed logical buffer cache pages 54(1), 54(2), 54(3) and compressed buffer cache page container 52(d) stores four compressed logical buffer cache pages 54(4), 54(5), 54(6), 54(7). Each compressed logical buffer cache page 54 may have originally been a buffer cache page 52 that was compressed and placed into another buffer cache page 52 as its container together with other compressed logical buffer cache pages 54 in order to free space within the buffer cache 50 without actually deleting data. It is possible to decompress a compressed logical buffer cache page 54 back into a buffer cache page 52 if that page is needed again.

Memory 46 also stores a set of buffer cache descriptors (BCDs) 56 (depicted as buffer cache descriptors 56(a), 56(b), 56(c), 56(d), 56(e), 56(f), 56(g), 56(h), . . . , 56(n)). The BCDs 56 are configured to each point to a particular buffer cache page 52 or to another BCD 56. In many embodiments, there is a fixed number, n, of BCDs 56 within memory 46, with n>m. Thus, for example, if there are 1 billion buffer cache pages 52 in the buffer cache 50, there may be 2 billion BCDs 56 in memory. This allows there to be a separate BCD 56 for every buffer cache page 52 and for every compressed logical buffer cache page 54. However, there may be some BCDs 56 that do not correspond to either a buffer cache page 52 or to a compressed logical buffer cache page 54—these non-associated BCDs 56 are held in reserve in case they are needed at a later time as more buffer cache pages 52 are compressed into compressed logical buffer cache pages 54. Thus, as depicted, BCD 56(a) is held in reserve.

The BCDs that are held in reserve are arranged into a reserve pool or a reserve queue 58, also stored within memory 46, for management purposes. Thus, reserve queue 58 includes a pointer 59 to a first BCD 56(a) held in reserve, and the first BCD 56(a) held in reserve may contain a pointer to another BCD 56 held in reserve in a linked list (or doubly-linked list) arrangement.

Memory 46 also stores an invalid queue 60 and a Least-Recently-Used (LRU) queue 62, as well as one or more logical caches (e.g., indirect block cache 64), which are responsible for using active data stored within the buffer cache pages 52. The invalid queue 60 is used to manage BCDs 56 that point to buffer cache pages 52 that do not store any valid data (e.g., data which has been permanently deleted). Thus, invalid queue 60 includes a pointer 61 to a first BCD 56(b) that points to a buffer cache page 52(a) that does not currently store valid data, and that first BCD 56(b) may contain a pointer (in a linked list or doubly-linked list arrangement) to another BCD 56 that points to another buffer cache page 52.

The LRU queue 62 is used to manage buffer cache pages 52 and their associated BCDs 56 that are no longer in active use by any of the logical caches (e.g., 64) but which do still store valid data (e.g., an inode for a file of the filesystem 40 which has been closed, but which may yet be accessed again). Thus, LRU queue 62 includes a pointer 63 to a first BCD 56(c) that points to a surrogate BCD 56(d) that points to a container buffer cache page 52(b) for storing a set of compressed logical buffer cache pages 54(1)-54(3). A surrogate BCD is a BCD 56 that BCDs in a compressed portion of the LRU queue 62 point to instead of pointing directly to their respective compressed logical buffer cache pages 54. The first BCD 56(c) of LRU queue 62 may contain a pointer (in a linked list or doubly-linked list arrangement) to another BCD 56 that points to another buffer cache page 52. The BCDs 56 at the head (i.e., the beginning, which represents BCDs 56 that were least-recently added to the LRU queue 62) of the LRU queue 62 relate to compressed buffer cache pages 52, 54 (i.e., container buffer cache pages 52 that each store multiple compressed logical buffer cache pages 54), while the BCDs 56 at the tail ((i.e., the end, which represents BCDs 56 that were most-recently added to the LRU queue 62) of the LRU queue 62 relate to uncompressed buffer cache pages 52.

The set of logical caches may include, by way of example, various logical caches. Including an indirect block cache 64, an inode cache (not depicted), and a data cache (not depicted), although, in other embodiments, different logical caches may be used.

Indirect block cache 64 is used to manage (by action of manager 65) buffer cache pages 52 and their respective BCDs 56 that are actively in use by a filesystem manager (not depicted) for storing indirect blocks of filesystem 40. Thus, while a file is open for reading or writing, the buffer cache pages 52 that store indirect blocks of that file may remain active, being managed by manager 65 of the indirect block cache 64. Indirect block cache 64 stores a set of hints 66 (depicted as hints 66(a), 66(b), 66(c)), each of which contains a pointer to a BCD 56 that may or may not currently be associated with a buffer cache page 52 that stores a particular indirect block. Once an indirect block is no longer in active use by the filesystem manager (e.g., the file has been closed and all data and metadata of the file has been flushed to disk), a hint 66 for the BCD 56 of that indirect block is still maintained in the indirect block cache 64 (although the BCD 56 would be placed on the LRU queue 62) unless the indirect block becomes moot (e.g., the file is deleted, in which case the BCD 56 would be placed on the invalid queue 60 instead). In a typical arrangement, the hints 66 of the indirect block queue are stored in a hash table, hashed according to a filesystem identifier and position within the filesystem 40 for easy access. Each hint 66 also includes a generation number, which is used to determine if the data within the buffer cache page 52 associated with the BCD 56 that that hint points to is still valid, or if that BCD has been re-claimed for use with different data.

An inode cache may similarly be used to manage buffer cache pages 52 and their respective BCDs 56 that are actively in use by a filesystem manager (not depicted) for storing inodes of filesystem 40. Thus, while a file is open for reading or writing, the buffer cache pages 52 that store the inode of that file may remain active, being managed by a manager of the inode cache. The inode cache may also store a set of hints, being structured in a similar manner as indirect block cache 64.

A data cache may similarly be used to manage buffer cache pages 52 and their respective BCDs 56 that are actively in use by a filesystem manager (not depicted) for storing data blocks 44 of filesystem 40. Thus, while a file is open for reading or writing, the buffer cache pages 52 that store the data blocks 44 of that file may remain active, being managed by a manager of the data cache. The data cache may also store a set of hints, being structured in a similar manner as indirect block cache 64.

Memory 46 also stores a cache manager 72, which is responsible for managing aspects of the cache not managed by one of the other managers (e.g., indirect block cache manager 65, inode cache manager, or data cache manager). Thus, for example, cache manager 72 is responsible for compressing the head end of the LRU queue 62, for assigning BCDs 56 to particular buffer cache pages 52, and for returning fresh or re-accessed BCDs 56 to any module or manager that requests such access when possible.

Figure 2:
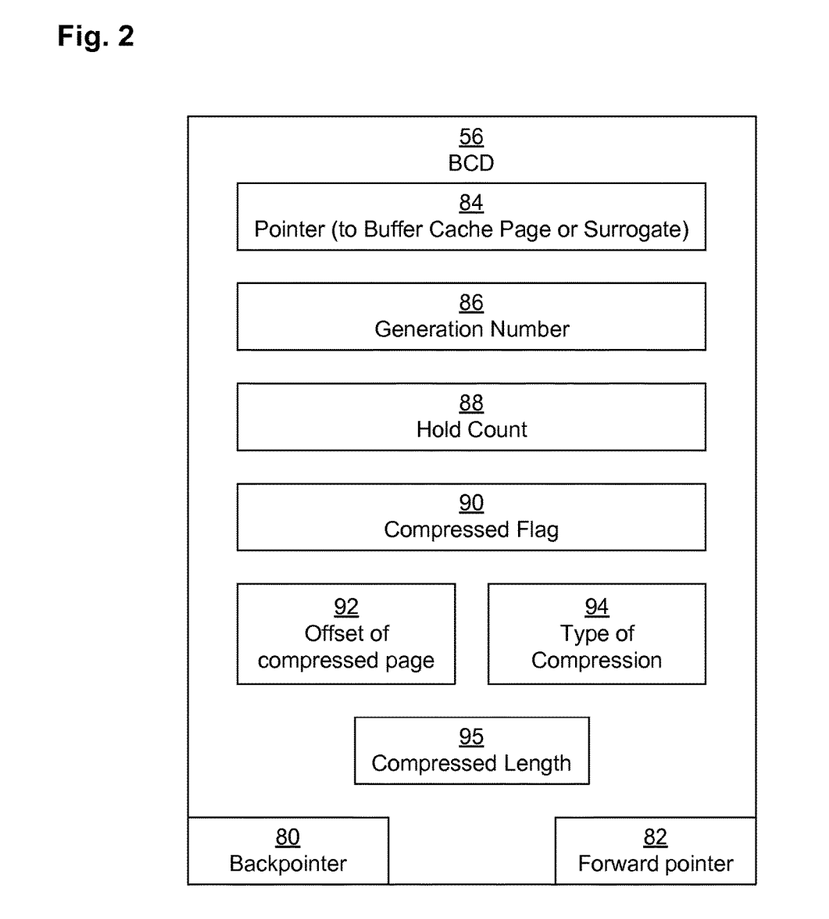
FIG. 2 depicts an example data structure for use in conjunction with various embodiments.

FIG. 2 depicts an example BCD 56 in further detail. Each BCD 56 is an object with a data structure, such as depicted in FIG. 2. The BCD 56 data structure includes a pair of pointers, backpointer 80 and forward pointer 82 that allow BCDs 56 to be chained together in a doubly-linked list, such as on the LRU queue 62. Thus, the backpointer 80 points to the previous BCD 56 on the linked list, while the forward pointer 82 points to the next BCD 56 on the linked list. If the backpointer is null, then the BCD 56 is the first (head) element in the linked list, and if the forward pointer is null, then the BCD 56 is the last (tail) element in the linked list. In some embodiments, instead of utilizing a doubly-linked structure, a singly-linked structure may be used, in which case, the backpointer 80 is omitted from the data structure of the BCD 56.

The BCD 56 data structure also includes a pointer 84 to the buffer cache page 52 with which the BCD 56 is associated (although, when compressed, the pointer 84 instead points to a surrogate BCD 56), a generation number 86, a hold count 88, and a compressed flag 90. When the BCD is associated with a logical compressed buffer cache page 54, in addition to the compressed flag 90 being marked in the affirmative, the BCD 56 data structure also includes an offset 92 of the logical compressed buffer cache page 54 within its respective container buffer cache page 52 as well as, in some embodiments, an indication 94 of the type of compression used and a compressed length 95 of the logical compressed buffer cache page 54.

The hold count 88 is used to indicate how many logical entities are "using" the BCD 56. Thus, if indirect block cache 64 is actively using the BCD 56, then its hold count is at least 1 (possibly more if another entity is also using it). In addition, a surrogate BCD has as many holds as there are BCDs 56 on the LRU queue 62 that point to it. However, any BCD 56 on the LRU queue 62 itself or on the reserve queue 58 or invalid queue 60 has a hold count of 0.

The generation number 86 is used to indicate what generation the BCD 56 is in terms of re-use of the BCD 56 for different data. Thus, initially, a BCD 56 may have a generation number 86 set to 1, but once it is placed on the invalid queue 60, its associated data in its associated buffer cache page 52 is no longer relevant or even guaranteed to be the same as it was before, so the generation number is incremented to be 2. However, when a BCD 56 is placed on the LRU queue 62, its generation number 86 is maintained, in case the entity that placed it there (e.g., indirect block cache 64) attempts to re-access it. Only once the BCD 56 is extracted from the LRU queue 62 (e.g., to be used in response to a request for a fresh BCD 56 and buffer cache page 52), is the generation number 86 incremented.

A BCD 56 may also include additional fields, however, these are not depicted for the sake of simplicity of description.

Figure 3:
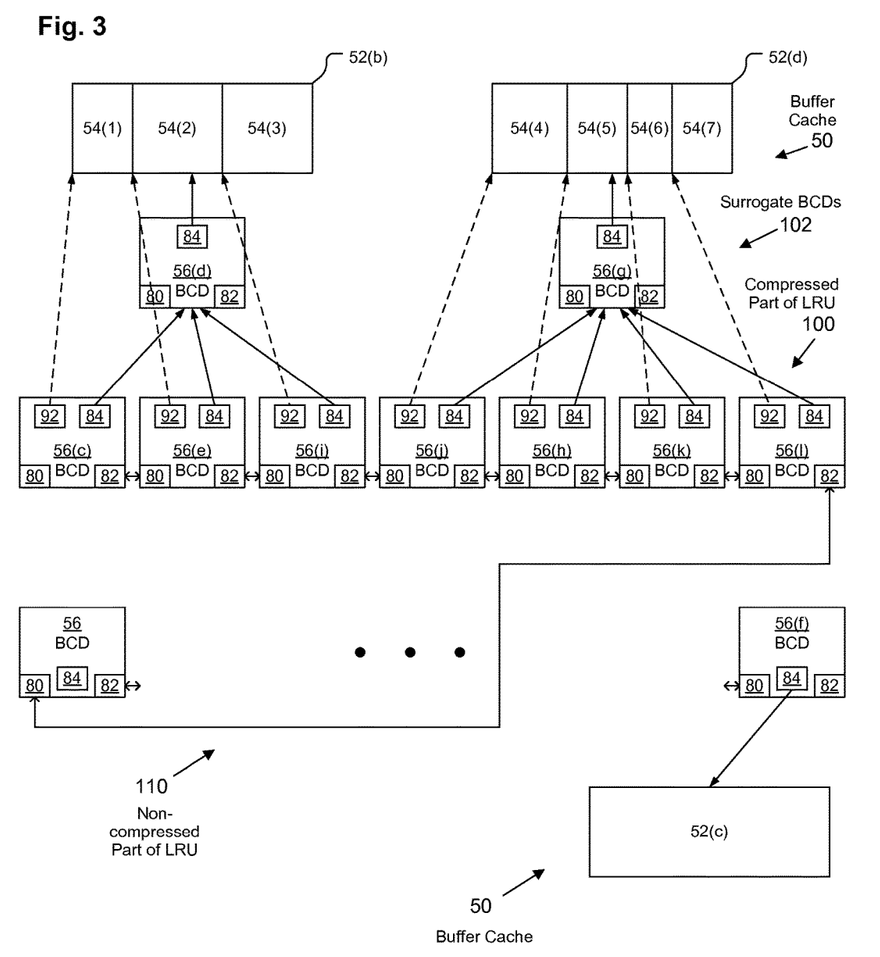
FIG. 3 depicts an example logical arrangement of an LRU queue for use in conjunction with various embodiments.

FIG. 3 illustrates an example logical structure of the LRU queue 62 and its relationship to other elements. As depicted, the LRU queue 62 (continuing in the example from FIG. 1) has BCD 56(*c*) at its head and BCD 56(*f*) at its tail. Head BCD 56(*c*) links forward to the second BCD 56(*e*) of the LRU queue 62 via forward pointer 82. Second BCD 56(*e*) correspondingly links backwards to the head BCD 56(*c*) via its backpointer 80.

LRU queue 62 includes a compressed portion 100 towards its head and a non-compressed portion 110 towards its tail. As depicted, compressed portion 100 includes BCDs 56(*c*), 56(*e*), 56(*i*), 56(*j*), 56(*h*), 56(*k*), and 56(*l*) in that order. As depicted, the first three BCDs 56(*c*), 56(*e*), 56(*i*) all represent compressed logical buffer cache pages 54 (compressed logical buffer cache pages 54(1), 54(2), 54(3), respectively) that are stored within the same container buffer cache page 52(*b*). This is implemented by having each of these first three BCDs 56(*c*), 56(*e*), 56(*i*) point to a surrogate BCD 56(*d*) with their respective pointers 84. Surrogate BCD 56(*d*), in turn, points to the container buffer cache page 52(*b*) with its pointer 84. Each of the first three BCDs 56(*c*), 56(*e*), 56(*i*) has a hold count 88 set to zero because all BCDs 56 on the LRU queue 62 have no holds placed thereon. However, surrogate BCD 56(*d*) (which is not actually on the LRU queue 62) has a hold count 88 set to 3, since 3 BCDs 56(*c*), 56(*e*), 56(*i*) point to it.

Each of the first three BCDs 56(*c*), 56(*e*), 56(*i*) has a compressed flag 90 set to TRUE, since they are respectively associated with compressed logical buffer cache pages 54(1), 54(2), 54(3) rather than uncompressed buffer cache pages 52. In order to locate where in the container buffer cache page 52(*b*) the compressed logical buffer cache pages 54(1), 54(2), 54(3) for each of the first three BCDs 56(*c*), 56(*e*), 56(*i*) is stored, each of the first three BCDs 56(*c*), 56(*e*), 56(*i*) stores an offset 92 of its respective compressed logical buffer cache page 54(1), 54(2), 54(3) within container buffer cache page 52(b). Thus, for example, head BCD 56(c) may have an offset value 92 set to zero, while second BCD 56(e) may have an offset value 92 set to 2,048 bytes, while third BCD 56(i) may have an offset value 92 set to 5,120 bytes.

As depicted, the next four BCDs 56(j), 56(h), 56(k), 56(l) all represent compressed logical buffer cache pages 54 (compressed logical buffer cache pages 54(4), 54(5), 54(6), 54(7) respectively) that are stored within the same container buffer cache page 52(d). This is implemented by having each of these four BCDs 556(j), 56(h), 56(k), 56(l) point to a surrogate BCD 56(g) with their respective pointers 84. Surrogate BCD 56(g), in turn, points to the container buffer cache page 52(d) with its pointer 84. Each of these four BCDs 56(j), 56(h), 56(k), 56(l) has a hold count 88 set to zero because all BCDs 56 on the LRU queue 62 have no holds placed thereon. However, surrogate BCD 56(g) (which is not actually on the LRU queue 62) has a hold count 88 set to 4, since 4 BCDs 56(j), 56(h), 56(k), 56(l) point to it.

Each of these four BCDs 56(j), 56(h), 56(k), 56(l) has a compressed flag 90 set to TRUE, since they are respectively associated with compressed logical buffer cache pages 54(4), 54(5), 54(6), 54(7) rather than uncompressed buffer cache pages 52. In order to locate where in the container buffer cache page 52(g) the compressed logical buffer cache pages 54(4), 54(5), 54(6), 54(7) for each of these four BCDs 56(j), 56(h), 56(k), 56(l) is stored, each of these four BCDs 56(j), 56(h), 56(k), 56(l) stores an offset 92 of its respective compressed logical buffer cache page 54(4), 54(5), 54(6), 54(7) within container buffer cache page 52(g). Thus, for example, fourth BCD 56(c) may have an offset value 92 set to zero, while fifth BCD 56(e) may have an offset value 92 set to 2,560 bytes, etc.

As depicted, the remaining BCDs 56 of the LRU queue 62 are not compressed, being on the non-compressed end 110. For example, the tail BCD 56(f) represents a non-compressed buffer cache page 52(c). This is implemented by having the tail BCD 56(f) point directly to non-compressed buffer cache page 52(c) with its pointer 84. Tail BCD 56(f) has a hold count 88 set to zero because all BCDs 56 on the LRU queue 62 have no holds placed thereon. Tail BCD 56(f) also has a compressed flag 90 set to FALSE because it is associated with a non-compressed buffer cache page 52(c) rather than a compressed logical buffer cache page 54.

Figure 4:
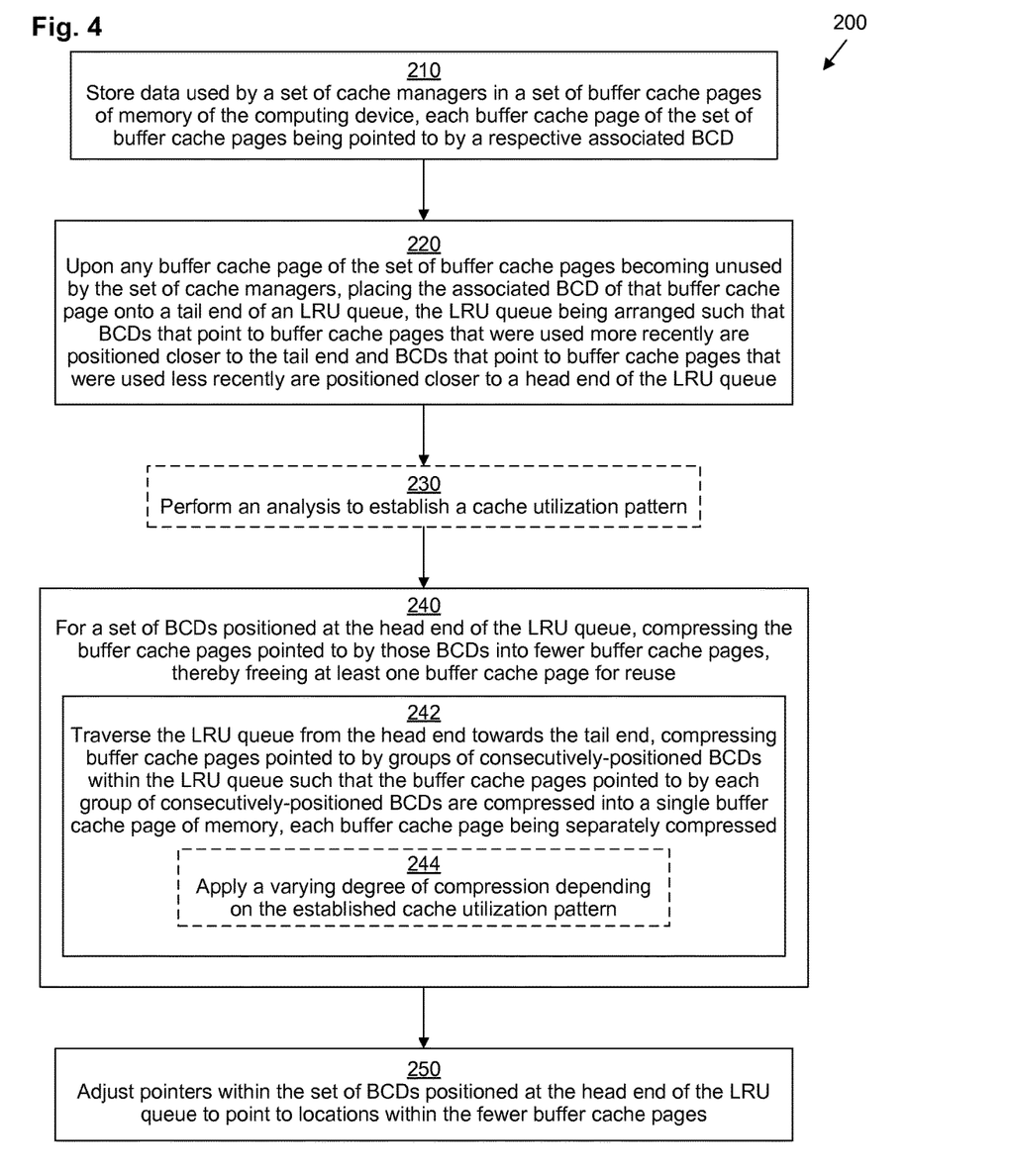
FIG. 4 depicts an example method of storing cache pages in compressed form using an LRU queue according to various embodiments.

FIG. 4 illustrates an example method 200 according to various embodiments, performed by a computing device such as DSS 30, for storing buffer cache pages 52 in compressed form (e.g., as compressed logical buffer cache pages 54) using the LRU queue 62 according to various embodiments. It should be understood that any time a piece of software, such as, for example, cache manager 72, indirect block cache manager 65, etc., is described as performing a method, process, step, or function, in actuality what is meant is that a computing device (e.g., DSS 30) on which that piece of software 70, 72 is running performs the method, process, step, or function when executing that piece of software on its processor (e.g., processor 32).

It should be understood that, within FIG. 4, step 230 and sub-step 244 are dashed because they may be ancillary or optional to method 200.

In step 110, cache manager 72 stores data used by a set of cache managers (e.g., indirect block cache manager 65, inode cache manager, and data cache manager, etc.) in a set of buffer cache pages 52 of memory 46, each buffer cache page 52 of the set of buffer cache pages being pointed to by a respective associated BCD 56.

In step 220, upon any buffer cache page 52 of the set of buffer cache pages becoming unused by the set of cache managers, cache manager 72 places the associated BCD 56 of that buffer cache page 52 onto a tail end of an LRU queue 62, the LRU queue 62 being arranged such that BCDs 56 that point to buffer cache pages 52 that were used more recently are positioned closer to the tail end and BCDs 56 that point to buffer cache pages 52 that were used less recently are positioned closer to a head end of the LRU queue 62.

In some embodiments, step 230 is now performed. In step 230, cache manager 72 performs an analysis to establish a cache utilization pattern. This analysis is useful for determining a type of compression to use later on. In some embodiments, this analysis includes determining how many BCDs 56 were requested from the head end of the LRU queue 56 in a period of time (e.g., within the last 10 seconds). In some embodiments, the analysis also includes determining how many BCDs 56 were requested from within the LRU queue 62 for re-access in the period of time.

In step 240, for a set of BCDs 56 (e.g., BCDs 56(c), 56(e), 56(i), 56(j), 56(h), 56(k), and 56(l)) positioned at the head end of the LRU queue 62, compressing the buffer cache pages 52 pointed to by those BCDs 56 into fewer buffer cache pages (e.g., container buffer cache pages 52(b), 52(d)), thereby freeing at least one buffer cache page 52 for reuse. Thus, instead of BCDs 56(c), 56(e), 56(i), 56(j), 56(h), 56(k), and 56(l) initially each pointing to a total of seven buffer cache pages 52, BCDs 56(c), 56(e), 56(i), 56(j), 56(h), 56(k), and 56(l)) now point (indirectly) to only two container buffer cache pages 52(b), 52(d), allowing five buffer cache pages 52 to be freed.

Step 240 may be accomplished by applying sub-step 242. In sub-step 240, cache manager 72 traverses the LRU queue 62 from the head end towards the tail end, compressing buffer cache pages 52 pointed to by groups of consecutively-positioned BCDs (e.g., a first group made up of BCDs 56(c), 56(e), and 56(i) and a second group made up of BCDs 56(j), 56(h), 56(k), and 56(l)) within the LRU queue 626 such that the buffer cache pages 52 pointed to by each group of consecutively-positioned BCDs are compressed into a single buffer cache page of memory (e.g., container buffer cache page 52(b) for the first group and container buffer cache page 52(d) for the second group), each buffer cache page 52 being separately compressed (e.g., becoming compressed logical buffer cache pages 54(1), 54(2), 54(3) for the first group and compressed logical buffer cache pages 54(4), 54(5), 54(6), 54(7) for the second group).

In some embodiments, sub-step 242 is accomplished by sub-sub-step 244. In sub-sub-step 144, cache manager 72 applies a varying degree of compression depending on the established cache utilization pattern. This may include selecting from a variety of compression algorithms which vary in what average number buffer cache pages 52 associated with consecutively-positioned BCDs 56 may be compressed into a single container buffer cache page 52 as compressed logical buffer cache pages 54. Cache manager 72 may then store an indication of the selected compression algorithm within value 94 of each BCD 56.

Applying the varying degree of compression may also include deciding how far to traverse the LRU queue 62 from the head end towards the tail end in performing compression.

In addition, applying the varying degree of compression depending on the established cache utilization pattern may include applying a higher level of compression when more BCDs 56 were requested from the head end of the LRU queue 62 in the period of time and applying a lower level of compression when fewer BCDs 56 were requested from the head end of the LRU queue 62 in the period of time. In addition, applying the varying degree of compression depending on the established cache utilization pattern may also include applying a lower level of compression when more BCDs 56 were requested from within the LRU queue 62 for re-access in the period of time and applying a higher level of compression when fewer BCDs 56 were requested from within the LRU queue 62 for re-access in the period of time.

In step 250, cache manager 72 adjusts pointers within the set of BCDs 56 positioned at the head end of the LRU queue 62 to point to locations within the fewer buffer cache pages 52. This may be accomplished by applying sub-steps 251-255 depicted within FIG. 5.

Figure 5:
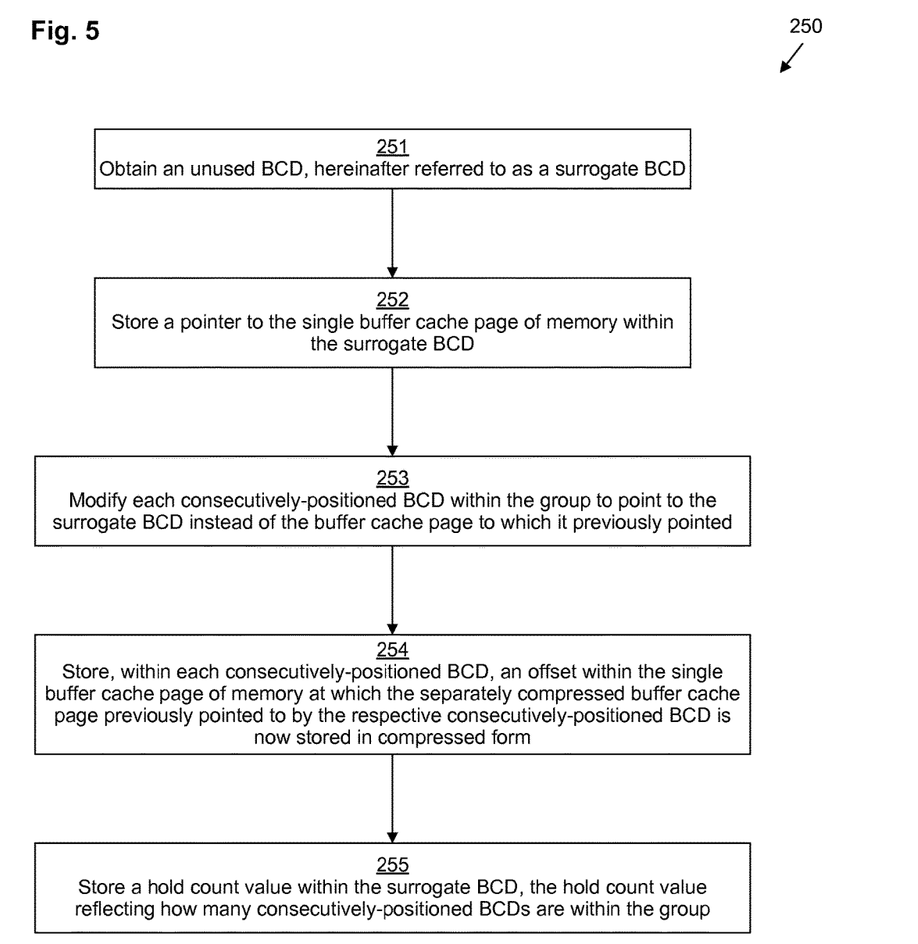
FIG. 5 depicts detailed example sub-steps for LRU queue pointer adjustment.

In sub-step 251, cache manager 72 obtains an unused BCD 56, hereinafter referred to as a surrogate BCD. This may be done, for example, by taking a BCD 56 from the invalid queue 60, if any are available. If not, cache manager 72 may request a fresh BCD 56 from the head of the LRU queue 62 (see below in connection with FIG. 7).

In sub-step 252, cache manager 72 stores a pointer 84 to the container buffer cache page 52 (e.g., container buffer cache page 52(b), 52(d)) within the surrogate BCD (e.g., 56(d), 56(g)).

In sub-step 253, cache manager 72 modifies each consecutively-positioned BCD 56 (e.g., BCDs 56(c), 56(e), and 56(i) for the first group) within the group to point (i.e., using pointer 84) to the surrogate BCD (e.g., surrogate BCD 56(d) for the first group) instead of the buffer cache page 52 to which it previously pointed.

In sub-step 254, cache manager 72 stores, within each consecutively-positioned BCD 56 (e.g., BCDs 56(c), 56(e), and 56(i) for the first group), an offset 92 within the container buffer cache page 56 (e.g., surrogate BCD 56(d) for the first group) at which the separately compressed buffer cache page 52 previously pointed to by the respective consecutively-positioned BCD 56 is now stored in compressed form as compressed logical buffer cache pages 54 (e.g., compressed logical buffer cache pages 54(1), 54(2), 54(3) for the first group). Cache manager 72 may also store the compressed length 95 of each consecutively-positioned BCD 56 (e.g., BCDs 56(c), 56(e), and 56(i) for the first group) within the container buffer cache page 56 (e.g., surrogate BCD 56(d) for the first group) that each respective compressed logical buffer cache page 54 (e.g., compressed logical buffer cache pages 54(1), 54(2), 54(3) for the first group) uses, storing this compressed length 95 inside the respective consecutively-positioned BCDs 56 (e.g., BCDs 56(c), 56(e), and 56(i) for the first group).

In sub-step 255, cache manager 72 stores a hold count value 88 within the surrogate BCD (e.g., surrogate BCD 56(d) for the first group), the hold count value 88 reflecting how many consecutively-positioned BCDs 56 (e.g., BCDs 56(c), 56(e), and 56(i) for the first group) are within the group.

Figure 6:
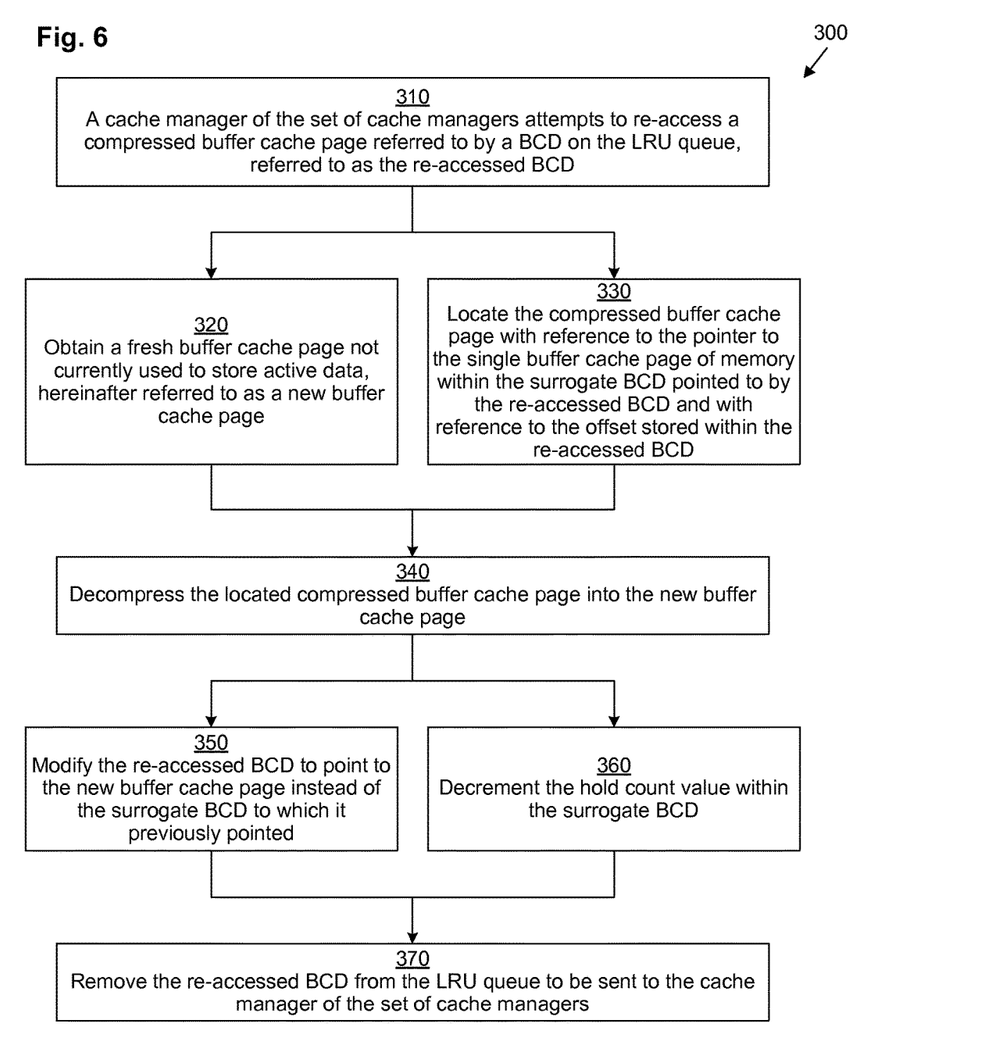
FIG. 6 depicts an example method of re-accessing a cache page from the compressed portion of the LRU queue according to various embodiments.

FIG. 6 illustrates an example method 300 according to various embodiments, performed by a computing device such as DSS 30, for re-accessing a BCD 56 and associated buffer cache page 52 from the compressed portion 110 of the LRU queue 62 according to various embodiments.

In step 310, a cache manager (e.g., indirect block cache manager 69) of the set of cache managers attempts to re-access a compressed buffer cache page referred to by a BCD 56 (e.g., BCD 56(h)) on the LRU queue 62, referred to as the re-accessed BCD 56(h). In some embodiments, this may involve the indirect block cache manager 69 resolving its hint 66 into a pointer to the re-accessed BCD 56(h) as well as a generation number for the re-accessed BCD 56(h) stored within the hint 66. If the generation number stored within the hint 66 matches the generation number 86 stored within the re-accessed BCD 56(h), then the hint 66 is still valid, and operation may proceed.

In response, cache manager 72 performs steps 320 and 330, which may be performed in parallel.

In step 320, cache manager 72 obtains a fresh buffer cache page 52 not currently used to store active data, hereinafter referred to as a new buffer cache page. This may be done, for example, by taking a buffer cache page 52 (e.g., buffer cache page 52(a)) associated with a BCD 56 (e.g., BCD 56(b)) from the invalid queue 60, if any are available. If not, cache manager 72 may request a fresh BCD 56 from the head of the LRU queue 62 (see below in connection with FIG. 7). In either case, the BCD 56 from the indirect queue 60 or the head of the LRU queue 62 may be discarded (being sent to the reserve queue 58).

In step 320, cache manager 72 locates the compressed logical buffer cache page 54 (e.g., compressed logical buffer cache page 54(5)) with reference to the pointer 84 (to, e.g., the container buffer cache page 52(b)) within the surrogate BCD (e.g., 56(d)) pointed to by the re-accessed BCD 56(h) and with reference to the offset 92 (and compressed length 95) stored within the re-accessed BCD 56(h).

In step 340, cache manager 72 decompresses the located compressed logical buffer cache page 54(5) into the new buffer cache page 52 (e.g., buffer cache page 52(a)).

In response, cache manager 72 performs steps 350 and 360, which may be performed in parallel.

In step 350, cache manager 72 modifies the re-accessed BCD 56(h) to point to the new buffer cache page (e.g., buffer cache page 52(a)) instead of the surrogate BCD (e.g., 56(d)) to which it previously pointed.

In step 360, cache manager 72 decrements the hold count value 88 within the surrogate BCD (e.g., 56(d)). Once the hold count 88 for the surrogate BCD (e.g., 56(d)) reaches zero, the surrogate BCD (e.g., 56(d)) may be freed to the reserve queue 58.

In step 370, cache manager 72 removes the re-accessed BCD 56(h) from the LRU queue 62 to be sent to the cache manager (e.g., indirect block cache manager 69) of the set of cache managers.

Figure 7:
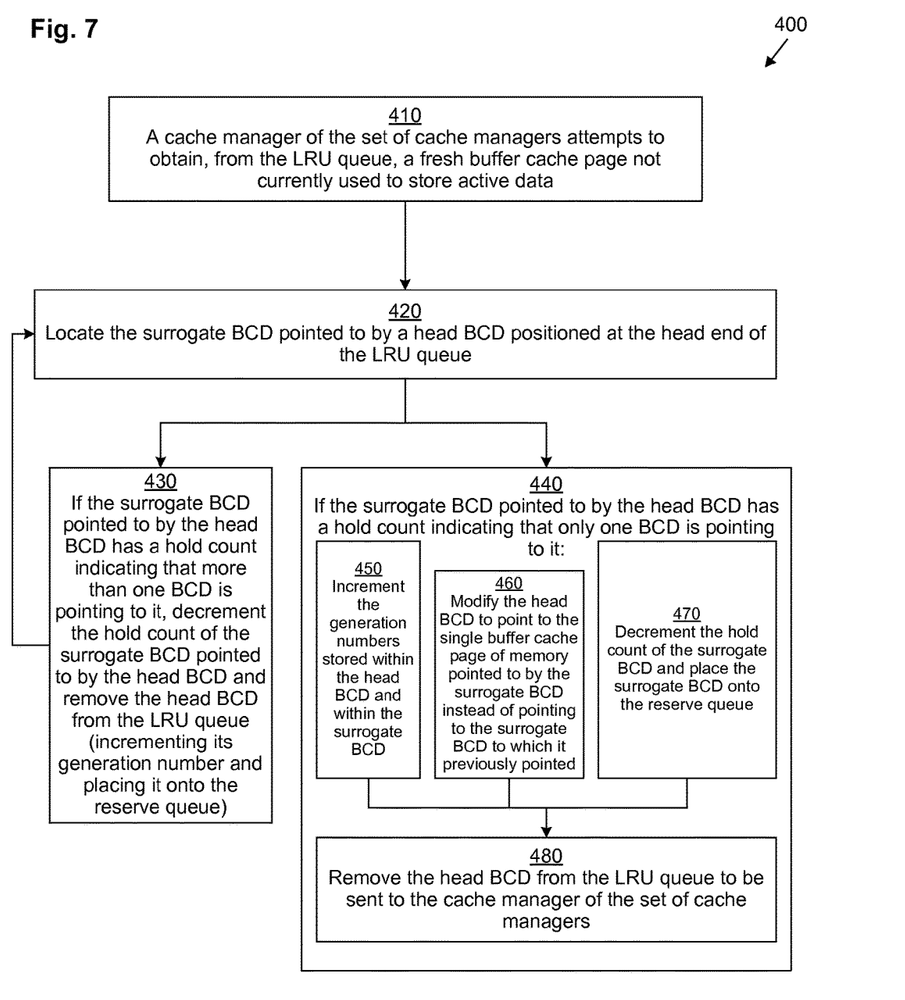
FIG. 7 depicts an example method of re-claiming fresh buffers from the head of the LRU queue according to various embodiments.

FIG. 7 illustrates an example method 400 according to various embodiments, performed by a computing device such as DSS 30, for re-claiming a fresh BCD 56 (and buffer cache page 52) from the head of the LRU queue 62 according to various embodiments.

In step 410, a cache manager (e.g., indirect block cache manager 69) of the set of cache managers attempts to obtain, from the LRU queue 62, a re-claimed fresh buffer cache page 52 not currently used to store active data. Step 410 may alternatively be performed by the cache manager 72 (e.g., in the performance of sub-step 251 or step 320).

In response, cache manager 72 locates the surrogate BCD (e.g., 56(d)) pointed to by the head BCD of the LRU queue 62, initially head BCD 56(c).

If the surrogate BCD 56(d) pointed to by the head BCD has a hold count 88 indicating that more than one BCD 56 is pointing to it (i.e., the hold count value 88 is greater than 1), then cache manager 72 performs step 430 and decrements the hold count value 88 of the surrogate BCD 56(d) pointed to by the head BCD 56 and removes the head BCD 56 from the LRU queue 62 (which may include incrementing the generation number 86 of the head BCD 56 and placing the head BCD 56 onto the reserve queue 58), then operation loops back to step 420, this time with a new head BCD 56. Thus, in the example of FIG. 3, initially the head BCD 56 may be BCD 56(*c*), but then it becomes 56(*e*), and then it becomes 56(*i*).

Once the looping stops and the surrogate BCD 56(*d*) pointed to by the head BCD (now 56(*i*)) has a hold count 88 indicating that only one BCD is pointing to it (i.e., the hold count value 88 is equal to 1), then cache manager 72 performs step 440 by performing sub-steps 450-480. Sub-steps 450, 460, and 470 may be performed in parallel.

In sub-step 450, cache manager 72 increments the generation number 86 stored within the head BCD 56(*i*) and the generation number 86 stored within the surrogate BCD 56(*d*) to invalidate any old data.

In sub-step 460, cache manager 72 modifies the head BCD 56(*i*), by changing the value of its pointer 84, to point to the buffer cache page 52(*b*) pointed to by the surrogate BCD 56(*d*) instead of pointing to the surrogate BCD 56(*d*) itself to which it previously pointed.

In sub-step 470, cache manager 72 decrements the hold count 88 of the surrogate BCD 56(*d*) (so the hold count 88 should now be zero) and places the surrogate BCD 56(*d*) into the reserve queue 58. The BCD 56(*d*) now no longer is validly associated with any buffer cache page 52.

In step 480, cache manager 72 removes the head BCD 56(*i*) from the LRU queue 62 to be sent to the cache manager (e.g., indirect block cache manager 69) of the set of cache managers as a fresh BCD with an associated empty buffer cache page 52(*b*) (technically, the data within the buffer cache page 52(*b*) is now invalid, but it is effectively empty).

Thus, embodiments have been described for compressing buffer cache pages 52 from an LRU queue 62 so that data takes longer to age off and be removed from the buffer cache 50. This increases the likelihood that data will be available within the cache 50 upon subsequent re-access, reducing the need for costly disk accesses due to cache misses.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method, performed by a computing device, of improving utilization of cache space of the computing device, the method comprising:
    storing data used by a set of cache managers in a set of buffer cache pages of memory of the computing device, each buffer cache page of the set of buffer cache pages being pointed to by a respective associated buffer cache descriptor (BCD);
    upon any buffer cache page of the set of buffer cache pages becoming unused by the set of cache managers, placing the associated BCD of that buffer cache page onto a tail end of an LRU (least-recently-used) queue, the LRU queue being arranged such that BCDs that point to buffer cache pages that were used more recently are positioned closer to the tail end and BCDs that point to buffer cache pages that were used less recently are positioned closer to a head end of the LRU queue;
    for a set of BCDs positioned at the head end of the LRU queue, compressing the buffer cache pages pointed to by those BCDs into fewer buffer cache pages, thereby freeing at least one buffer cache page for reuse; and
    adjusting pointers within the set of BCDs positioned at the head end of the LRU queue to point to locations within the fewer buffer cache pages;
    wherein compressing the buffer cache pages pointed to by those BCDs into fewer buffer cache pages includes traversing the LRU queue from the head end towards the tail end, compressing buffer cache pages pointed to by groups of consecutively-positioned BCDs within the LRU queue such that the buffer cache pages pointed to by each group of consecutively-positioned BCDs are compressed into a single buffer cache page of memory, each buffer cache page being separately compressed.

2. The method of claim 1 wherein adjusting pointers within the set of BCDs positioned at the head end of the LRU queue to point to locations within the fewer buffer cache pages includes, for each group of consecutively-positioned BCDs upon which compression was performed:
    obtaining an unused BCD, hereinafter referred to as a surrogate BCD;
    storing a pointer to the single buffer cache page of memory within the surrogate BCD;
    modifying each consecutively-positioned BCD within the group to point to the surrogate BCD instead of the buffer cache page to which it previously pointed;
    storing, within each consecutively-positioned BCD, an offset within the single buffer cache page of memory at which the separately compressed buffer cache page previously pointed to by the respective consecutively-positioned BCD is now stored in compressed form; and
    storing a hold count value within the surrogate BCD, the hold count value reflecting how many consecutively-positioned BCDs are within the group.

3. The method of claim 2 wherein the method further comprises, upon a cache manager of the set of cache managers attempting to re-access a compressed buffer cache page referred to by a BCD on the LRU queue, referred to as the re-accessed BCD:
    obtaining a fresh buffer cache page not currently used to store active data, hereinafter referred to as a new buffer cache page;
    locating the compressed buffer cache page with reference to the pointer to the single buffer cache page of memory within the surrogate BCD pointed to by the re-accessed BCD and with reference to the offset stored within the re-accessed BCD;

decompressing the located compressed buffer cache page into the new buffer cache page;

modifying the re-accessed BCD to point to the new buffer cache page instead of the surrogate BCD to which it previously pointed;

decrementing the hold count value within the surrogate BCD; and removing the re-accessed BCD from the LRU queue to be sent to the cache manager of the set of cache managers.

4. The method of claim 2 wherein the method further comprises, upon a cache manager of the set of cache managers attempting to obtain, from the LRU queue, a fresh buffer cache page not currently used to store active data:

locating the surrogate BCD pointed to by a head BCD positioned at the head end of the LRU queue;

when the surrogate BCD pointed to by the head BCD has a hold count indicating that more than one BCD is pointing to it, decrementing the hold count of the surrogate BCD pointed to by the head BCD and removing the head BCD from the LRU queue, repeating until the surrogate BCD pointed to by the head BCD has a hold count indicating that only one BCD is pointing to it; and when the surrogate BCD pointed to by the head BCD has a hold count indicating that only one BCD is pointing to it:

incrementing a generation number stored within the head BCD and a generation number stored within the surrogate BCD;

modifying the head BCD to point to the single buffer cache page of memory pointed to by the surrogate BCD instead of pointing to the surrogate BCD to which it previously pointed;

decrementing the hold count of the surrogate BCD and placing the surrogate BCD into a reserve pool of BCDs without associated buffer cache pages; and removing the head BCD from the LRU queue to be sent to the cache manager of the set of cache managers.

5. The method of claim 2 wherein freeing at least one buffer cache page for reuse includes, for at least one group of consecutively-positioned BCDs upon which compression was performed:

obtaining a BCD from a reserve pool of BCDs without associated buffer cache pages;

modifying the obtained BCD to point to a buffer cache page that was previously pointed to by one of the consecutively-positioned BCDs within the at least one group of consecutively-positioned BCDs upon which compression was performed; and placing the obtained BCD onto an invalid queue, making it available to provide a fresh buffer cache page.

6. The method of claim 1 wherein buffers pointed to by a plurality of BCDs positioned at the tail end of the LRU queue remain uncompressed.

7. The method of claim 1 wherein:

the method further includes performing an analysis to establish a cache utilization pattern; and compressing buffer cache pages pointed to by groups of consecutively-positioned BCDs within the LRU queue such that the buffer cache pages pointed to by each group of consecutively-positioned BCDs are compressed into a single buffer cache page of memory includes applying a varying degree of compression depending on the established cache utilization pattern.

8. The method of claim 7 wherein applying the varying degree of compression depending on the established cache utilization pattern includes selecting from a variety of compression algorithms which vary in what average number of consecutively-positioned BCDs may be compressed into a single buffer cache page of memory.

9. The method of claim 7 wherein applying the varying degree of compression depending on the established cache utilization pattern includes selecting how far to traverse the LRU queue from the head end towards the tail end in performing compression.

10. The method of claim 7 wherein:

performing the analysis to establish the cache utilization pattern includes determining how many BCDs were requested from the head end of the LRU queue in a period of time; and applying the varying degree of compression depending on the established cache utilization pattern includes applying a higher level of compression when more BCDs were requested from the head end of the LRU queue in the period of time and applying a lower level of compression when fewer BCDs were requested from the head end of the LRU queue in the period of time.

11. The method of claim 10 wherein:

performing the analysis to establish the cache utilization pattern further includes determining how many BCDs were requested from within the LRU queue for re-access in the period of time; and applying the varying degree of compression depending on the established cache utilization pattern includes applying a lower level of compression when more BCDs were requested from within the LRU queue for re-access in the period of time and applying a higher level of compression when fewer BCDs were requested from within the LRU queue for re-access in the period of time.

12. The method of claim 1 wherein the data used by the set of cache managers stored in the set of buffer cache pages includes filesystem metadata about a filesystem stored in persistent storage of the computing device, the computing device being configured to provide access to the filesystem.

13. An apparatus comprising:

memory, the memory storing:

a set of buffer cache descriptors (BCD); and a buffer cache comprising a set of buffer cache pages, each buffer cache page of the set of buffer cache pages being pointed to by a respective associated BCD of the set of BCDs; and processing circuitry configured to improve utilization of cache space by:

storing data used by a set of cache managers in the set of buffer cache pages;

upon any buffer cache page of the set of buffer cache pages becoming unused by the set of cache managers, placing the associated BCD of that buffer cache page onto a tail end of an LRU (least-recently-used) queue, the LRU queue being arranged such that BCDs that point to buffer cache pages that were used more recently are positioned closer to the tail end and BCDs that point to buffer cache pages that were used less recently are positioned closer to a head end of the LRU queue;

for a set of BCDs positioned at the head end of the LRU queue, compressing the buffer cache pages pointed to by those BCDs into fewer buffer cache pages, thereby freeing at least one buffer cache page for reuse; and adjusting pointers within the set of BCDs positioned at the head end of the LRU queue to point to locations within the fewer buffer cache pages;

wherein compressing the buffer cache pages pointed to by those BCDs into fewer buffer cache pages includes traversing the LRU queue from the head end towards the tail end, compressing buffer cache pages pointed to by groups of consecutively-positioned BCDs within the LRU queue such that the buffer cache pages pointed to by each group of consecutively-positioned BCDs are compressed into a single buffer cache page of memory, each buffer cache page being separately compressed.

14. The apparatus of claim 13 wherein:

the apparatus further comprises:

persistent storage that stores a filesystem; and a disk controller configured to control the persistent storage, allowing the apparatus to provide access to the filesystem; and the data used by the set of cache managers stored in the set of buffer cache pages includes filesystem metadata about the filesystem stored in the persistent storage.

15. The apparatus of claim 13 wherein adjusting pointers within the set of BCDs positioned at the head end of the LRU queue to point to locations within the fewer buffer cache pages includes, for each group of consecutively-positioned BCDs upon which compression was performed:

obtaining an unused BCD, hereinafter referred to as a surrogate BCD;

storing a pointer to the single buffer cache page of memory within the surrogate BCD;

modifying each consecutively-positioned BCD within the group to point to the surrogate BCD instead of the buffer cache page to which it previously pointed;

storing, within each consecutively-positioned BCD, an offset within the single buffer cache page of memory at which the separately compressed buffer cache page previously pointed to by the respective consecutively-positioned BCD is now stored in compressed form; and storing a hold count value within the surrogate BCD, the hold count value reflecting how many consecutively-positioned BCDs are within the group.

16. The apparatus of claim 13 wherein buffers pointed to by a plurality of BCDs positioned at the tail end of the LRU queue remain uncompressed.

17. The apparatus of claim 13 wherein:

the processing circuitry is further configured to perform an analysis to establish a cache utilization pattern; and compressing buffer cache pages pointed to by groups of consecutively-positioned BCDs within the LRU queue such that the buffer cache pages pointed to by each group of consecutively-positioned BCDs are compressed into a single buffer cache page of memory includes applying a varying degree of compression depending on the established cache utilization pattern.

18. A non-transitory computer-readable storage medium that stores instructions, which, when executed by a computing device, cause the computing device to improve utilization of cache space of the computing device by:

storing data used by a set of cache managers in a set of buffer cache pages of memory of the computing device, each buffer cache page of the set of buffer cache pages being pointed to by a respective buffer cache descriptor (BCD);

upon a buffer cache page of the set of buffer cache pages becoming unused by the set of cache managers, placing the respective BCD of that buffer cache page onto a tail of an LRU (least-recently-used) queue, the LRU queue being arranged such that BCDs that point to more recently used buffer cache pages are positioned closer to the tail and BCDs that point to less recently used buffer cache pages are positioned closer to a head of the LRU queue;

for a set of BCDs positioned at the head of the LRU queue, compressing the buffer cache pages pointed to by those BCDs into fewer buffer cache pages, thereby freeing at least one buffer cache page for reuse, by traversing the LRU queue from the head towards the tail, compressing buffer cache pages pointed to by groups of consecutively-positioned BCDs within the LRU queue such that the buffer cache pages pointed to by each group of consecutively-positioned BCDs are compressed into a single buffer cache page of memory, each buffer cache page being separately compressed; and adjusting pointers within the set of BCDs positioned at the head of the LRU queue to point to locations within the fewer buffer cache pages.

19. The non-transitory computer-readable storage medium of claim 18 wherein:

the instructions, when executed by the computing device, further cause the computing device to perform an analysis to establish a cache utilization pattern; and compressing buffer cache pages pointed to by groups of consecutively-positioned BCDs within the LRU queue such that the buffer cache pages pointed to by each group of consecutively-positioned BCDs are compressed into a single buffer cache page of memory includes applying a varying degree of compression depending on the established cache utilization pattern.

* * * * *